United States Patent
McMahon (10) Patent No.: US 10,520,061 B2
(45) Date of Patent: *Dec. 31, 2019

(54) STAMPED WHEEL BALANCING WEIGHT

(71) Applicant: WEGMAMN AUTOMOTIVE USA, Murfreesboro, TN (US)

(72) Inventor: Charles Robert McMahon, Murfreesboro, TN (US)

(73) Assignee: WEGMANN AUTOMOTIVE USA, Murfreesboro, TN (US)

(*) Notice: Subject to any disclaimer, the term of this patent is extended or adjusted under 35 U.S.C. 154(b) by 212 days.

This patent is subject to a terminal disclaimer.

(21) Appl. No.: 15/801,078

(22) Filed: Nov. 1, 2017

(65) Prior Publication Data

US 2018/0065409 A1    Mar. 8, 2018

Related U.S. Application Data

(63) Continuation of application No. 14/611,760, filed on Feb. 2, 2015, now Pat. No. 9,844,977, which is a continuation of application No. 13/467,444, filed on May 9, 2012, now Pat. No. 9,004,611.

(60) Provisional application No. 61/579,108, filed on Dec. 22, 2011.

(51) Int. Cl.
*F16F 15/32* (2006.01)
*B21D 22/02* (2006.01)

(52) U.S. Cl.
CPC ............ *F16F 15/324* (2013.01); *B21D 22/02* (2013.01); *B60B 2310/206* (2013.01); *B60B 2310/306* (2013.01); *Y10T 29/496* (2015.01)

(58) Field of Classification Search
CPC .......... F16F 15/324; F16F 15/32; F16F 15/34; F16F 15/345
See application file for complete search history.

(56) References Cited

U.S. PATENT DOCUMENTS

| | | | |
|---|---|---|---|
| 2,122,065 | A | 6/1938 | Hume |
| 3,633,263 | A | 1/1972 | Hoeksema |
| 3,688,380 | A | 9/1972 | Hofmann et al. |
| 6,238,005 | B1 | 5/2001 | Sugayauchi et al. |
| 6,250,721 | B1 | 6/2001 | Oba et al. |
| 6,364,421 | B1 | 4/2002 | Pursley |
| 6,553,831 | B1 | 4/2003 | Schmidt et al. |

(Continued)

FOREIGN PATENT DOCUMENTS

WO    2013/142664    9/2013

OTHER PUBLICATIONS

PCT International Search Report from ISA/US for PCT/US2013/033260 (published as WO 2013/142664 and related to U.S. Appl. No. 13/848,394 (published as US 2013/0285435)), dated Jun. 4, 2013.

*Primary Examiner* — Jason R Bellinger
(74) *Attorney, Agent, or Firm* — Steven H. Meyer, Esq.

(57) ABSTRACT

A wheel-balancing weight mounts to a wheel with a flange. The weight includes a body and a clip. The body is stamped by a punch to define a pocket within which an attaching portion of the clip resides. The defined pocket has a planar base and opposing side walls generally perpendicular to the base. The body as stamped by the punch includes a pre-stake for each side wall external to the pocket and adjacent the side wall, and an undercut for each side wall within the pocket and generally located at a juncture of the side wall and the base.

20 Claims, 4 Drawing Sheets

(56) References Cited

U.S. PATENT DOCUMENTS

| | | | |
|---|---|---|---|
| 6,592,188 B2 | 7/2003 | Yamaguchi | |
| 7,055,914 B1 | 6/2006 | Jenkins | |
| 7,093,907 B2 | 8/2006 | Jenkins | |
| 7,216,938 B2 | 5/2007 | Phillips | |
| 7,249,804 B2 | 7/2007 | Zank et al. | |
| 7,841,669 B2 | 11/2010 | Zank | |
| 7,878,599 B2 | 2/2011 | Astorino et al. | |
| 7,883,156 B2 | 2/2011 | Pursley et al. | |
| 8,066,335 B2 | 11/2011 | Jenkins | |
| 9,004,611 B2 * | 4/2015 | McMahon | F16F 15/324 301/5.21 |
| 9,169,895 B2 | 10/2015 | Everhard | |
| 9,228,634 B2 | 1/2016 | McMahon | |
| 9,844,977 B2 * | 12/2017 | McMahon | F16F 15/324 |
| 2005/0104439 A1 | 5/2005 | Phillips | |
| 2010/0253131 A1 | 10/2010 | Jenkins | |
| 2011/0266862 A1 | 11/2011 | Halle | |
| 2013/0285435 A1 | 10/2013 | McMahon | |

* cited by examiner

STAMPED WHEEL BALANCING WEIGHT

CROSS-REFERENCE TO RELATED APPLICATION

The present application is a continuation of U.S. patent application Ser. No. 14/611,760, filed on Feb. 2, 2015 and issued as U.S. Pat. No. 9,844,977, and entitled "STAMPED WHEEL BALANCING WEIGHT", hereby incorporated by reference in its entirety, which is a continuation of U.S. patent application Ser. No. 13/467,444, filed on May 9, 2012 issued as U.S. Pat. No. 9,004,611, and entitled "STAMPED WHEEL BALANCING WEIGHT", hereby incorporated by reference in its entirety, which claims priority from U.S. Provisional Pat. Application No. 61/579,108, filed on Dec. 22, 2011, hereby incorporated by reference in its entirety.

FIELD

The present disclosure relates to a wheel-balancing weight for balancing a wheel of a vehicle or the like. More particularly, the present disclosure relates to a wheel balancing weight with a body stamped from a dimensioned wire rather than a machined body.

DISCLOSURE

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components. Moreover, when the tire and wheel are coupled to a moving vehicle such as a passenger car, the vibration can be uncomfortable to an occupant.

Accordingly, and as is known, such tire, wheel, or combination thereof is balanced by appropriately applying one or more counter-balancing weights to compensate for a measured imbalance. Wheel balancing weights are known, and are for example discussed in detail in U.S. Pat. Nos. 6,553,831, 7,216,938, 7,249,804, and 7,841669, hereby incorporated by reference in their entirety, among others. Typically, although by no means absolute, in the case where a tire is mounted to a wheel of a vehicle, the wheel includes a circumferential flange or lip at a rim on either axial side thereof and a weight of appropriate mass is applied at each flange at an appropriate circumferential location thereof. Methods of measuring imbalance and determining where to apply the counter-balancing weights are generally known to the relevant public and therefore need not be described herein.

In at least some instances, such a counter-balancing weight for a vehicle has been constructed to have a body forming the majority of the mass of the weight and a clip by which the body is secured to the flange of a wheel, where the clip is attached to the body by any of several attaching mechanisms. For example, the clip may be swaged to a face of the body or affixed to a face of the body by way of one or more screws, rivets, expansion bolts, or the like. At present, it is typical that the body is formed from a metal material such as zinc or steel or the like, where the body is at least partially machined. In particular, it is typical that the body includes a formed pocket within which a portion of the clip is fitted and then secured to the body to form the weight, where the formed pocket is cut into the body by one or more appropriate cutting, routing, or abrading tools or the like.

Notably, such cutting, routing, abrading, and other machining imparts a substantial amount of detail and complexity into the construction of the body and the weight overall. Accordingly, a need exists for a wheel-balancing weight with a clip and a body that is formed without the need for such cutting, routing, abrading, and other machining. More particularly, a need exists for such a wheel-balancing weight where the pocket of the body is formed from a stamping process and therefore is less costly to produce.

DRAWINGS

The present innovation will be better understood when read in conjunction with the appended drawings. For the purpose of illustrating the various embodiments of the invention, there are shown in the drawings embodiments that are presently preferred. As should be understood, however, the invention is not limited to the precise arrangements and instrumentalities shown. In the drawings.

DESCRIPTION

Certain terminology may be used in the following description for convenience only and is not considered to be limiting. For example, the words "left", "right", "upper", "lower", "top", "bottom", "front", and "back" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 1A:
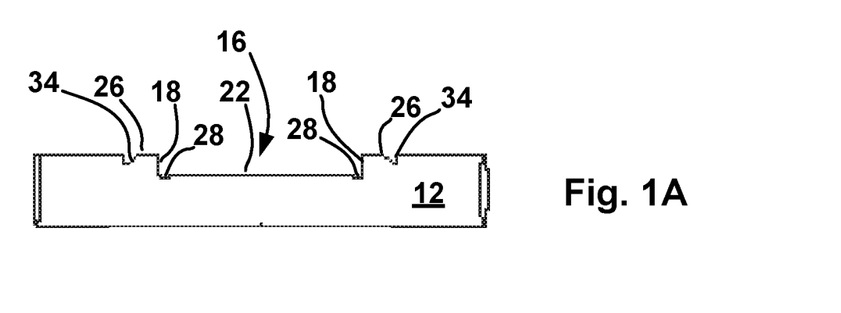
FIGS. 1A-1C show a wheel-balancing weight with a stamped body in accordance with various embodiments of the present innovation, and in particular show a side-elevational view of a body of the weight only (FIG. 1A), a similar side elevational view of the weight with a clip attached to the body (FIG. 1B), and a cross-sectional view taken along the line 1C-1C in FIG. 1B (FIG. 1C)
Figure 1B:
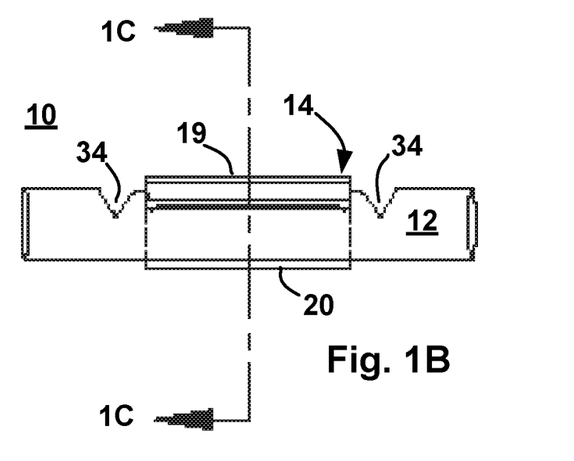
Figure 1C:
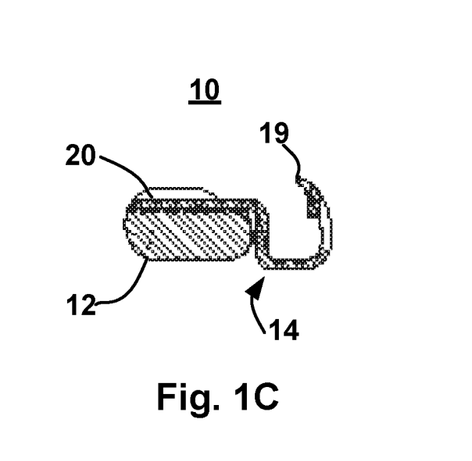
Figure 2A:
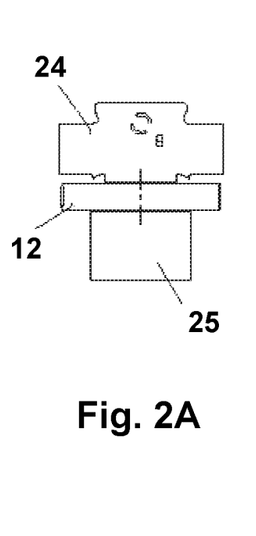
FIGS. 2A-2D progressively show a punch stamping the body of the weight of FIG. 1 in accordance with various embodiments of the present innovation.
Figure 2B:
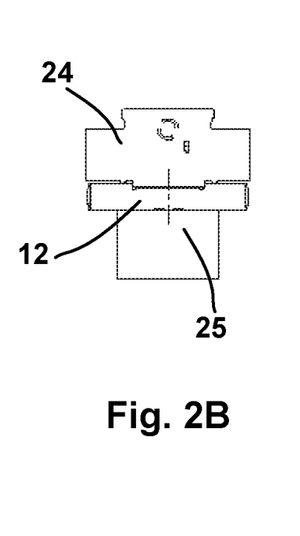
Figure 2C:
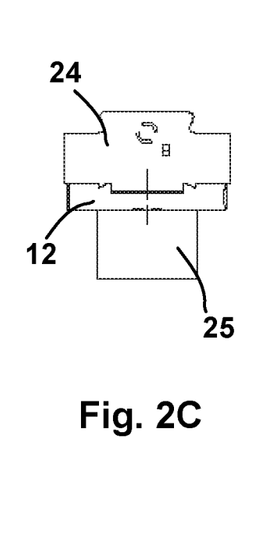
Figure 2D:
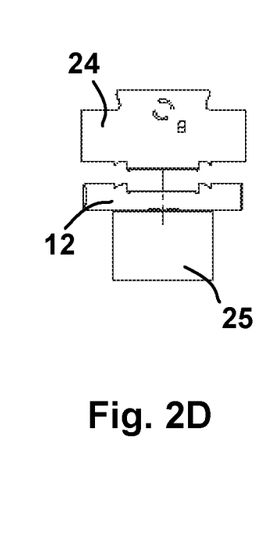

As shown in FIGS. 1A-1C, a wheel balancing weight 10 for a tire or the like includes a body 12 to impart mass and a clip 14 by which the body 12 is attached to a flange on a rim of the tire. Attaching such a weight 10 to such a flange by way of such a clip 14 is generally known or should be apparent to the relevant public and therefore need not be set forth herein in any detail other than that which is provided. Such attaching may be seen in one or more of the aforementioned U.S. Pat. Nos. 6,553,831, 7,216,938, 7,249,804, and 7,841669, which again are hereby incorporated by reference in their entirety.

The clip 14 is typically although by no means necessarily a length of a sheet of steel or the like with a relatively small thickness and a width on the order of an inch or so, where the sheet has been folded or bent along the length thereof in a predefined manner to be in a predefined form that includes a clipping portion 19 and an attaching portion 20, as is best seen in FIGS. 1B-1C. As is to be understood, the clipping portion 19 is formed to securely grasp the flange of the tire, and the attaching portion 20 is generally planar and co-acts with the body 12 to attach the clip 14 thereto. In particular, the clip 14 may be attached to the body 12 by positioning the attaching portion 20 thereof within a pocket 16 defined in the body 12, and then securing the attaching portion 20 to the body 12 by appropriate means such as a rivet or screw or other attaching device, or by being crimped or swaged by way of material in the body 12 adjacent the sides of the pocket 16. As seen, the pocket 16 is generally a relatively shallow and relatively planar depression mainly in a side (axial) face of the body 12, and may have a depth that is not much more than the thickness of the generally planar attaching portion 20 of the clip 14.

As should be appreciated, the pocket 16 is formed in such axial face of the body 12 to receive the attaching portion 20 of the clip 14, and in doing so to locate the clip 14 with respect to the body 12 in a relatively exact manner. Thus, the formed pocket 16 is defined by a generally planar base or bottom 22 against which a generally planar surface of the attaching portion of the clip 14 resides, and left and right side walls 18 that are generally perpendicular to and generally vertical with respect to the base 22. As may be appreciated, the side walls 18 tangentially locate the attaching portion 20 of the clip 14 within the pocket 16 of the body 12 and thus tangentially locate the clip 14 with respect to the body 12. As seen in FIG. 1C in particular, the clipping portion 19 of the clip 14 adjacent the attaching portion 20 may abut the body 12 when the clip 14 is secured to the body 12, and as such radially locates the clip 14 with respect to the body 12.

As may be appreciated, the pocket 16 may be machined into the body 12 by cutting, routing, abrading, or other machining tools that remove material from the body 12 to define the pocket 16, such that the machined pocket 16 has the planar base 22 and perpendicular side walls 18 set forth above. Note, though, that such machining is relatively more expensive in terms of time required, machinery involved, and wasted material, among other things. Accordingly, in various embodiments of the present innovation, and as seen in FIGS. 2A-2D, the pocket 16 is stamped into the body 12 according to a predefined punch to define the pocket 16, where the stamped pocket 16 has the planar base 22 and perpendicular side walls 18 set forth above. As should be appreciated, stamping the pocket 16 is advantageous as compared to machining the pocket 16 inasmuch as such stamping is relatively less expensive in terms of time required, machinery involved, and wasted material, among other things.

Figure 3:
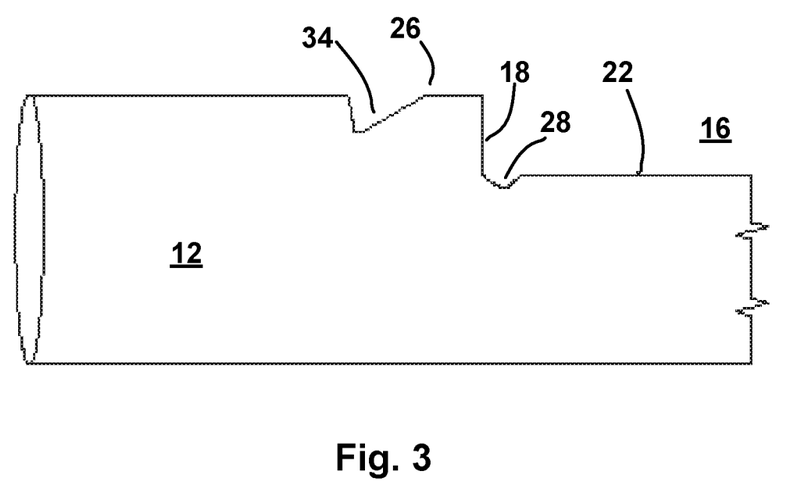
FIG. 3 shows a portion of the stamped body of FIG. 2 in accordance with various embodiments of the present innovation, where the punch imparts a pre-stake and an undercut to assist in forming a generally vertical or perpendicular side wall to a pocket of the body.

In various embodiments of the present innovation, the pocket 16 of the body 12 is stamped according to a punch or die 24 such as that seen in FIGS. 2A-2D so that the body 12 is imparted with a pre-stake 26 (also seen in FIG. 3) exterior to the pocket 16 but adjacent each side wall 18 of the pocket 16, and an undercut 28 within the pocket 16 generally at a juncture of each side wall 18 and the base 22 of the pocket 16. As best seen in FIG. 3, each pre-stake 26 as imparted to the body 12 is defined as a formed ridge of material exterior to the pocket 16 but immediately adjacent a respective side wall 18 thereof, where the ridge closely follows the side wall 18 and is bordered on one side by such side wall 18 and on the other side by a notch 34 formed by a cutting edge of the punch 24. In a similar manner, each undercut 28 as imparted to the body 12 is defined as a formed notch within the pocket 16 at the juncture of a respective side wall 18 and the base 22. Each pre-stake 26 and undercut 28 may follow along the entirety of a respective side wall 18 or may follow along only a portion of such respective side wall 18 as circumstances may warrant.

As shown in FIGS. 2A-2D, it may be that the punch 24 firstly strikes the body 12, which rests on a jig 25 or the like, to create the pocket 16 therein in a manner so that the pocket 16 and undercuts 28 begin to be formed (FIG. 2A to FIG. 2B), and then continues further with such strike to further form the pocket 16 and undercuts 28 and to create the pre-stakes 26 (FIG. 2B to FIG. 2C), after which the punch 24 is withdrawn (FIG. 2D), all in a single fluid striking motion. Notably, it has been found that imparting the body 12 with the pre-stake 26 and the undercut 28 for each side wall 18 in combination results in imparting the body 12 with the aforementioned generally perpendicular and/or vertical side walls 18. That is to say, without the pre-stakes 26 and undercuts 28, each side wall 18 would in effect be washed out by the striking force of the punch 24.

With the pre-stakes 26 and the undercuts 28, however, and as should be appreciated, the washing out of each side wall 18 is prevented and/or is rectified by the force exerted by the portions of the punch 24 that create each pre-stake 26 and undercut 38. In particular, a force exerted by the portion of the punch 24 that creates each pre-stake 26 moves adjacent material of the body 12 toward what becomes the respective side wall 18, and counters a force exerted by the portion of the punch 24 that creates each undercut 28 on the adjacent side wall 18 and moves adjacent material up and into formation. In combination, then, the two countering forces result in such generally vertical and/or perpendicular adjacent side wall 18.

Note that the geometry of each pre-stake 26 and each undercut 28 as created by respective portions of the punch 24 may be any appropriate geometry, although empirically it has been found that acceptable results are achieved by the geometry shown in FIG. 3. In such geometry, each pre-stake 26 as formed by the punch 24 of FIG. 2 is found to exhibit a notch 34 with a V-formation in cross-section, including a relatively shallower wall proximate the adjacent side wall 18 and a relatively steeper wall distal from the adjacent side wall 18. Similarly, each undercut 28 as formed by the punch of FIG. 2 is found to exhibit a notch mainly in the base 22 but abutting the adjacent side wall 18. Here, the notch of the undercut 28 may have a V-formation in cross-section, or may have a different formation such as a radiused curve. Likewise, the notch 34 of the pre-stake 26 may alternately have a different formation too.

Figure 4:
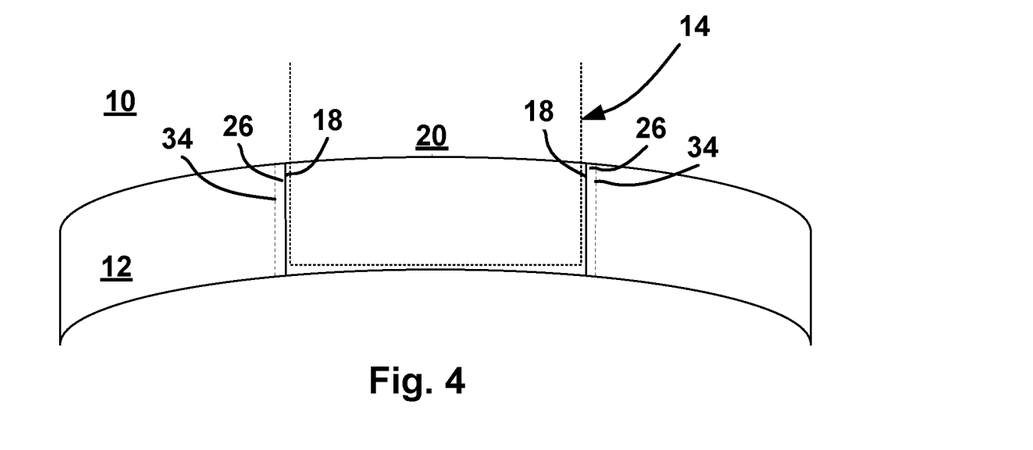
FIG. 4 shows a top view of the body and a portion of the clip of the weight of FIGS. 1A-1C.

Returning now to FIGS. 1A-1C, and also referring now to FIG. 4, it is seen that after the body 12 is stamped by the punch 24 of FIG. 2 to include the pocket 16, pre-stakes 26, and undercuts 28, a clip 14 may be appropriately positioned within the stamped pocket 16 (only the attaching portion 20 of the clip being shown in FIG. 4) and then secured to the body 12 by crimping, swaging, stamping, staking, or the like. Notably, such crimping, swaging, stamping, staking, or the like may take advantage of the already-stamped pre-stakes 26.

In particular, and as was alluded to above, each already-stamped pre-stake 26 includes or defines a notch 34 and a ridge or region of crimping material interposed between such notch 34 and the adjacent side wall 18, where the notch 34, ridge, and side wall 18 all extend along with each other for some length. As should be appreciated, such ridge or region of crimping material as defined is more easily urged over an adjacent edge of the attaching portion 20 of the positioned clip 14 within the pocket 16 during a crimping operation so as to secure such clip 14 to the body 12. Also, such notch 34 tends to define a zone within which a staking blade on a crimping tool can strike the body 12 (not shown) in order to perform such urging. Thus, and as may be appreciated from FIG. 1B in particular, after such a staking blade of such a crimping tool strikes the body 12 and indeed does urge each region of crimping material over the attaching portion 20 of the clip 14 as positioned within the pocket 16, the stamped pre-stake 26 has been altered to include or define a much deeper notch 34. Notably, such crimping by way of such staking blade is believed to require only a vertical downward force on the notch 34 of the pre-stake 26, and not an angled force on the region of crimping material, and thus may be performed in a simpler manner.

It is to be appreciated that most any appropriate equipment may be employed to stamp the body 12 of the weight 10 by way of the punch 24. For example, the equipment to stamp the body 12 in particular may receive a continuous feed of unwound wire having a predefined dimension, then straighten the wire, and then impart a curvature having a predefined radius to the wire so as to match the radius of the flange on the rim. Note here that the received wire may initially have a cross-sectional diameter on the order of one-quarter to one-half inch, and that the wire may also be flattened during straightening and/or curving into a somewhat oval or elliptical cross-section so as to fit more closely to the rim. Once curved, the wire is then fed to a coining station having the punch 24 of FIG. 2 such that the pocket 16 is stamped into the curved wire. Thereafter, an appropriate length of the curved and stamped wire may be cut off at a cut-off station so as to result in a unit of a body 12 having a predetermined mass.

Similarly, it is to be appreciated that most any appropriate equipment may be employed to crimp or otherwise securely attach a clip 14 to the stamped body 12 to form the weight 10. For example, the crimping equipment may receive and appropriately position a stamped body 12 in a jig or the like, and then receive and appropriately position an already-formed clip 14 in the same jig or the like. As should be understood, in so doing the attaching portion 20 of the clip 14 is appropriately tangentially and radially located within the pocket 16 of the body 12. Thereafter, the aforementioned staking blade of a crimping tool strikes the body 12 at each notch 34 of each pre-stake 26 to urge each ridge of crimping material over the attaching portion 20 of the clip 14 as positioned within the pocket 16, thereby securing the clip 14 to the body 12 and forming the weight 10.

Note here that each side wall 18 of the pocket 16 as imparted to the body 12 need not be absolutely vertical/perpendicular, but instead may approach such vertical/perpendicular state with respect to the base 22, without departing from the present innovation. That is to say, each side wall 18 should be well-formed to approach such vertical/perpendicular state, but only insofar as the side wall 18 positively tangentially locates the attaching portion 20 of the clip 14 within the pocket 16 of the body 12 without allowing the clip 14 to have more than minimal play as tangentially located. Accordingly, if the side wall 18 were to be on the order of 15 or even 30 degrees out of true perpendicular/vertical but still positively locates the clip 14, such side wall 18 would be acceptable.

Figure 4A:
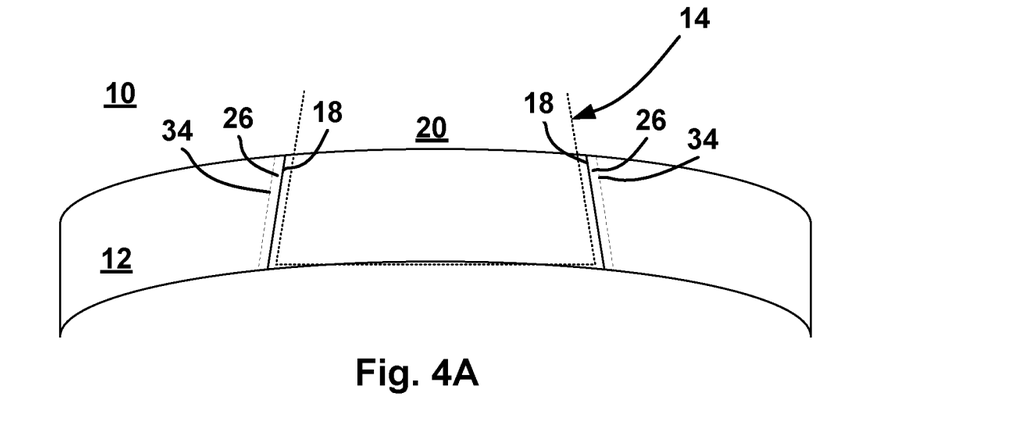
FIG. 4A shows a top view in alternate embodiments of the present innovation with respect to that of FIG. 4.
Figure 5:
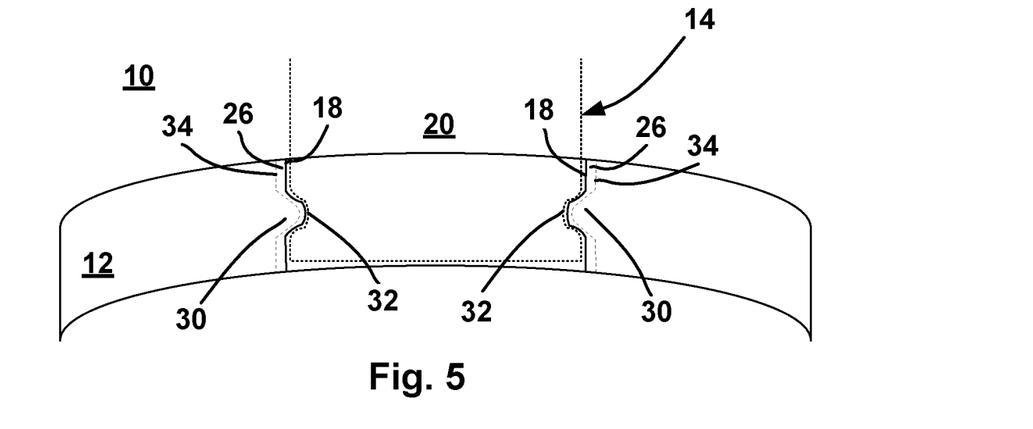
FIG. 5 shows a top view of a weight similar to that of FIGS. 1A-1C in accordance with alternate embodiments of the present innovation.

In various embodiments, the side walls 18 of the body 12 may be generally planar and parallel with respect to each other, such as is seen in FIG. 4. Such side walls 18 may alternately be generally planar but angled with respect to each other, perhaps such that the pocket 16 exhibits a generally trapezoidal appearance when viewed according to the top view of FIG. 4, such as is seen in FIG. 4A. Such side walls 18 need not necessarily be planar, however. In one embodiment, for example, and as seen in FIG. 5, each side wall 18 may exhibit one or more protrusions 30 that each extend along the surface of the body 12 and toward the pocket 16, thereby reducing the area of the pocket 16. As may be appreciated, each such protrusion 30 may key to a corresponding indentation 32 in a corresponding side edge of the attaching portion 20 of the clip 14 (partially shown in FIG. 5), and in so doing may positively radially locate the clip 14 within the pocket 16 of the body 12.

Note that by including such a protrusion 30 for each side wall 18 as in FIG. 5, the pre-stake 26 and undercut 28 for each side wall 18 may require alteration to form the side wall 18 with such a protrusion 30. In particular, the pre-stake 26 and undercut 28 may closely follow the side wall 18 with the protrusion 30 in order to form same, as is shown, or may generally follow the side wall 18 with the protrusion 30 to form same if such close following has not been found to be needed.

Note too that rather than including a protrusion 30 in each side wall 18 and an indentation 32 in each side edge of the attaching portion 20 of the clip 14, the protrusions 30 and indentations 32 may be exchanged so that an indentation 32 is in each side wall 18 and a protrusion 30 is in each side edge of the attaching portion 20 of the clip 14. In such a case, and again, the pre-stake 26 and undercut 28 for each side wall 18 may require alteration to form the side wall 18 with such an indentation 32.

CONCLUSION

In the foregoing description, it can be seen that the present innovation comprises a new and useful stamped wheel balancing weight 10 having a clip 14 and a stamped body 12 that is formed without the need for cutting, routing, abrading, and other machining. Therefore, the body 12 and the weight 10 are less costly to produce. It should be appreciated that changes could be made to the embodiments described above without departing from the innovative concepts thereof. For one example, the form of the pocket 16 of the stamped body 12 may differ, as may the form of the pre-stakes 26 and undercuts 28. It should be understood, therefore, that this innovation is not limited to the particular embodiments disclosed, but it is intended to cover modifications within the spirit and scope of the present disclosure.

The invention claimed is:

1. A wheel balancing weight for mounting to a wheel with a flange, the weight including a body and a clip, the body for providing a predetermined mass to the weight and the clip for grasping the flange to secure the weight thereto, the body having an attaching face and a pocket defined in the attaching face within which an attaching portion of the clip resides, the defined pocket having a planar base and opposing side walls generally perpendicular to the base, the body also including a pre-stake zone in the attaching face generally external to the pocket and adjacent each side wall, the body further including an undercut defined within the pocket adjacent each side wall, each defined undercut being generally located at a juncture of the respective side wall and the base, each pre-stake zone including a securing ridge of material over an adjacent edge of the attaching portion of the clip resident within the pocket, each pre-stake zone also including an enlarged notch in the attaching face, the securing ridge and the enlarged notch of the pre-stake zone following a respective side wall thereof, the securing ridge being immediately adjacent the respective side wall and being bordered on one lateral side thereof by the respective side wall and on the other lateral side thereof by the respective enlarged notch, each enlarged notch having a V-formation in cross-section, the securing ridges in combination securing the attaching portion of the clip to the body.

2. The weight of claim 1 wherein each undercut is defined as a formed notch within the pocket at a juncture of the respective side wall and the base.

3. The weight of claim 1 wherein each undercut is defined as a formed notch within the pocket at a juncture of a respective side wall and the base, the formed notch having a radiused curve formation in cross-section.

4. The weight of claim 1 wherein each pre-stake zone and each undercut follows along substantially all of a respective side wall.

5. The weight of claim 1 wherein the clip is secured to the body by crimping or swaging to form each securing ridge as material of the body adjacent the side wall thereof urged over a respective side edge of the attaching portion of the clip as resident in the pocket, the crimping or swaging resulting in the enlarged notch of the pre-stake zone.

6. The weight of claim 1 wherein the clip is secured to the body by crimping or swaging to form each securing ridge as material of the body adjacent the side wall thereof urged over a respective side edge of the attaching portion of the clip as resident in the pocket, each enlarged notch being a strike zone for the crimping or swaging action and thereby being enlarged as a result of the crimping or swaging action.

7. The weight of claim 1 wherein each side wall is generally linear and the side walls are generally parallel.

8. The weight of claim 1 wherein each side wall is generally linear and the side walls are angled with respect to each, the pocket being generally trapezoidal.

9. The weight of claim 1 wherein the attaching face is an axial face of the body.

10. The weight of claim 1 wherein each pre-stake zone is a struck pre-stake in the attaching face generally external to the pocket and adjacent each side wall, each struck pre-stake includes an urged ridge of material over an adjacent edge of the attaching portion of the clip resident within the pocket, and each struck pre-stake also includes an enlarged notch in the attaching face where the pre-stake was struck.

11. A body for a wheel balancing weight for mounting to a wheel with a flange, the weight including the body and a clip, the body for providing a predetermined mass to the weight and the clip for grasping the flange to secure the weight thereto, the body having an attaching face and a pocket defined in the attaching face within which an attaching portion of the clip is to reside, the defined pocket having a planar base and opposing side walls generally perpendicular to the base, the body also including a pre-stake defined in the attaching face adjacent each side wall, each defined pre-stake being external to the pocket, the body further including an undercut defined within the pocket adjacent each side wall, each defined undercut being generally located at a juncture of the respective side wall and the base, each pre-stake being defined in the body to include a formed ridge of material exterior to the pocket and a notch in the attaching face, the ridge and the notch of the pre-stake following a respective side wall thereof, the ridge being immediately adjacent the respective side wall and being bordered on one lateral side thereof by the respective side wall and on the other lateral side thereof by the respective notch, each notch having a V-formation in cross-section, including a wall proximate the respective side wall and a wall distal from the respective side wall, the wall distal from the respective side wall being steeper than the wall proximate the respective side wall.

12. The body of claim 11 wherein each undercut is defined as a formed notch within the pocket at a juncture of the respective side wall and the base.

13. The body of claim 11 wherein each undercut is defined as a formed notch within the pocket at a juncture of a respective side wall and the base, the formed notch having a radiused curve formation in cross-section.

14. The body of claim 11 wherein each pre-stake and each undercut follows along substantially all of a respective side wall.

15. The body of claim 11 wherein the pre-stake and the undercut of each side wall in combination contribute to imparting the side wall with the perpendicularity thereof during formation of the body.

16. The body of claim 11 wherein the clip is to be secured to the body by positioning the attaching portion of the clip within the pocket of the body and crimping or swaging the body at each pre-stake to urge the ridge thereof adjacent the respective side wall over side edges of the attaching portion of the clip as positioned in the pocket.

17. The body of claim 11 wherein the clip is to be secured to the body by positioning the attaching portion of the clip within the pocket of the body and crimping or swaging the body at each pre-stake to urge the ridge thereof adjacent the respective side wall over side edges of the attaching portion of the clip as positioned in the pocket, the notch of each pre-stake defining a strike zone for the crimping or swaging action and thereby being enlarged after the crimping or swaging action.

18. The body of claim 11 wherein each side wall is generally linear and the side walls are generally parallel.

19. The body of claim 11 wherein each side wall is generally linear and the side walls are angled with respect to each, the pocket being generally trapezoidal.

20. The body of claim 11 wherein the attaching face is an axial face of the body.

* * * * *

UNITED STATES PATENT AND TRADEMARK OFFICE
CERTIFICATE OF CORRECTION

PATENT NO. : 10,520,061 B2
APPLICATION NO. : 15/801078
DATED : December 31, 2019
INVENTOR(S) : Charles Robert McMahon

Page 1 of 1

It is certified that error appears in the above-identified patent and that said Letters Patent is hereby corrected as shown below:

On the Title Page

Left column, (71) Applicant: delete "WEGMAMN" and insert -- WEGMANN -- therefor.

Signed and Sealed this
Eighteenth Day of February, 2020

Andrei Iancu
*Director of the United States Patent and Trademark Office*